Dec. 7, 1965 R. W. GALKE ETAL Re. 25,926

RECORD CHANGER MECHANISM

Original Filed Feb. 29, 1960

INVENTORS

Ralph W. Galke

Richard A. Hathaway

By Francis W. Crotty

Atty.

United States Patent Office

Re. 25,926
Reissued Dec. 7, 1965

25,926

RECORD CHANGER MECHANISM

Ralph W. Galke, Bellwood, and Richard A. Hathaway, Des Plaines, Ill., assignors to Zenith Radio Corporation, a corporation of Delaware Original No. 3,038,728, dated June 12, 1962, Ser. No. 11,883, Feb. 29, 1960. Application for reissue Feb. 12, 1963, Ser. No. 258,956
9 Claims. (Cl. 274—10)

Matter enclosed in heavy brackets [ ] appears in the original patent but forms no part of this reissue specification; matter printed in italics indicates the additions made by reissue.

The present invention is directed to the reject mechanism of an automatic record changer and concerns, in particular, the operation of the reject mechanism from a remote location.

The inclusion of a reject mechanism in an automatic record changer is common practice in the art to permit the user to listen to only a part, or perhaps to skip entirely, the play of one or more records of a group accommodated by the magazine of the record changer and otherwise played sequentially. Structurally, the reject usually takes the form of some linkage that is displaced, upon manipulation of a reject knob, to move along a path where it engages the trip lever of the record-change assembly to start that assembly on a cycle of operations. It is, of course, recognized that a reject lever could be so displaced and returned to its rest position upon the energization of a solenoid but this has the distinct disadvantage that a considerable amount of work has to be accomplished by the solenoid.

Additionally, it is desirable in the arrangement of remotely-controlled instruments to have a single control signal perform two functions, namely, turning the phonograph mechanism "on" and thereafter accomplishing reject at the will of the user. It is further desirable that the structure, at the same time, permit the phonograph to be turned "on" and thereafter the reject function accomplished manually. It is indeed difficult to achieve this degree of flexibility through a simple solenoid actuation of the usual reject lever.

Accordingly, it is a principal object of the invention to provide a novel remotely-controlled reject mechanism for an automatic record changer.

It is a specific object of the invention to provide a reject mechanism for an automatic phonograph which may be operated manually or automatically from a remote location.

It is still another object of the invention to provide an improved structure for accomplishing remote control of the on/off and reject functions of an automatic record changer.

The reject mechanism to be described is especially suited for an automatic record changer of the type that includes a record-change assembly having a trip lever which may be actuated to initiate a cycle of operations of that assembly. The reject mechanism comprises a trigger lever which is movable from a rest position, in which it has no operative association with the record-change assembly, to a second position in which it effects actuation of the trip lever. A spring biases the trigger lever to its aforesaid second position but a latch releasably restrains the trigger in its rest position against the urging of the spring. A relay, which may respond to a signal transmitted from a remote point, is provided to actuate the latch and release the trigger lever to institute a record-change cycle. Finally, there is a reset which actuates in response to the operation of the record-change assembly to restore the trigger to its rest position and reset the latch to restrain the trigger in that position.

The foregoing and other objects of the invention, together with further advantages and benefits thereof, will be more clearly understood from the following description of particular embodiments thereof taken in conjunction with the annexed drawing in the several figures of which like components are designated by similar reference characters and in which.

Figure 1:
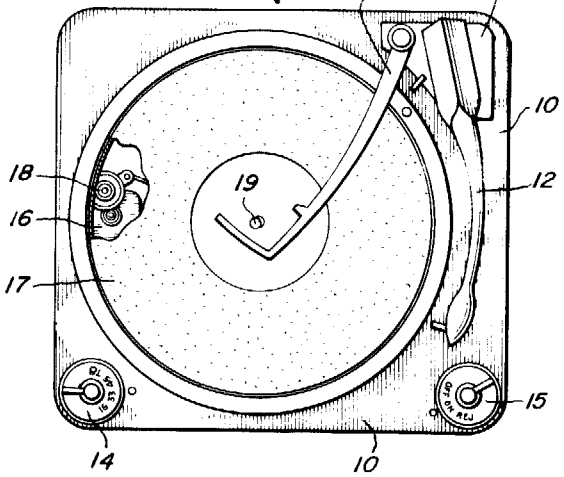
FIGURE 1 is a plan view, partially broken away, of an automatic record changer including a reject mechanism constructed in accordance with the invention.

Referring now more particularly to FIGURE 1, the record changer there represented is, except for the reject mechanism which will be described in detail hereinafter, of conventional design and construction. It has a base 10 on which are located a mount structure 11 for a tone arm 12 and a pressure arm 13. It also accommodates the usual manual adjustments including a speed control 14 and an on/off and reject knob 15. Base 10 is also the principal support for the operating mechanism of the instrument including a driving motor 16, which appears through a broken away section of the turntable 17. As usual, the turntable has a depending flange which may be engaged by a drive pulley 18 to effect rotation thereof. The mechanical drive between motor 16 and pulley 18 generally includes a family of pulleys of different diameters or other suitable structure for selectively driving the turntable at any one of a plurality of rotational speeds even though the driving motor is a constant speed device. Speed selection is attained by manipulation of knob 14.

A so-called center-drop spindle 19 is positioned at the center or axis of rotation of the turntable, being disposed vertically to serve as a magazine or storage facility for a group of records having center apertures which correspond in diameter to the spindle. In addition to serving as a record-storing magazine, the spindle functions, under the control of a record-change assembly, to feed records one after the other from the magazine to the surface of the turntable. The structure of such a spindle is well understood in the art and therefore has not been shown in any detail. Suffice it to say that the spindle has a principal body section and terminates at its free end in another section which is offset relative to the principal sections. The offset between these sections defines a shoulder against which a stack of records, threaded over the upper section, may rest. An ejector is located within the principal section of the spindle and extends into the aperture of the lowest record of the stack. This ejector is movable during the record-change cycle to slide or displace only the last record of the stack off the shoulder that it might feed onto the turntable.

Pressure arm 13 serves as a stabilizer to retain the stored records in a desired horizontal position. It may also accomplish the function of automatic shut-off after the playing of the last record in a manner that is well understood in the art.

Tone arm 12 carries a stylus at its free end and is controlled by the record-change apparatus to set down at the leading edge of a record, track the record throughout the entire program recorded thereon and then, by coursing a groove which has a distinctly different pitch from that of the program grooves, actuate the record-change apparatus to start a cycle of operations which first lifts the tone arm from engagement with the record that has been played and then moves it to the position shown in FIGURE 1. In this position, the tone arm is clear of the path of a descending record so that the ejecting mechanism of the spindle may feed the next record from the magazine onto the turntable. When this has been accomplished, the tone arm is returned to the leading portion of the program groove of the record that is now positioned on the turntable in order that it may be played in a repetition of this same general cycle of operations.

As indicated above, all of the structure is entirely conventional so that it has not been deemed necessary to show the mechanism or describe its operation in any greater detail. Consideration will now be given more particularly to the record-reject mechanism illustrated in FIGURE 2.

In its broadest aspect, the reject mechanism comprises a trigger lever 20 which is movable from a rest position in which it has no operative association with the record-change assembly to a second position in which it effects actuation of the trip lever generally included in the record-change assembly. The trigger 20 is a simple lever pivotally mounted about a pin 21 and movable from its rest position which is shown in the full-line construction of FIGURE 2 to its second position which is represented in broken-line construction in the same figure. Its association with the record-change assembly is through the agency of a reject lever 23.

Figure 2:
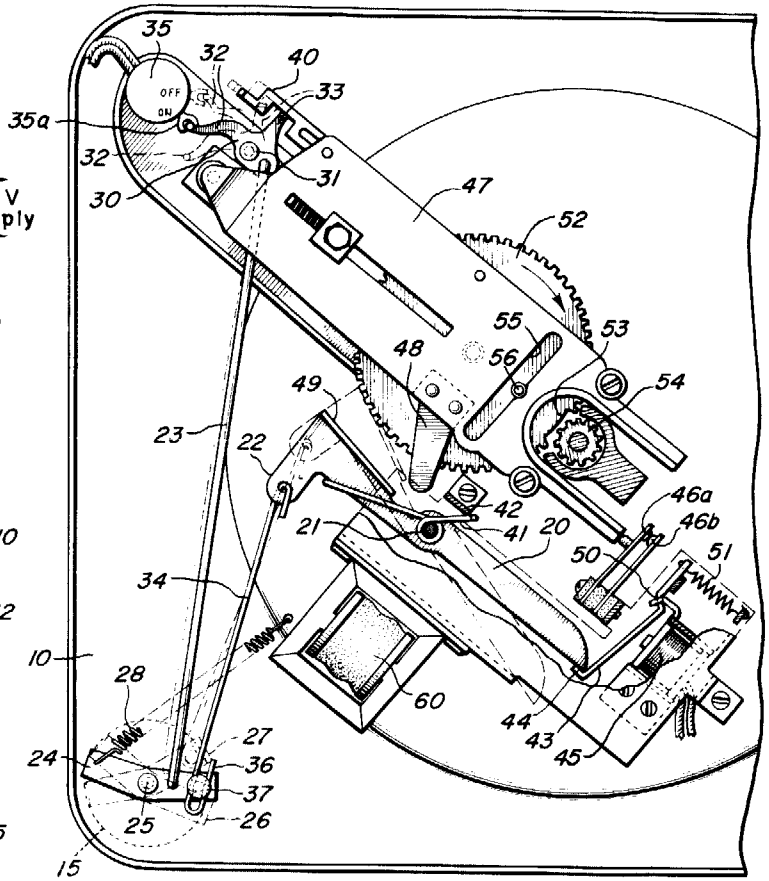
FIGURE 2 shows a portion of the record changer viewed from underneath.

Lever 23 doubles for reject and also as the on/off switch operator. At one end it is captivated in a lever 24 which is secured to a pin or stub shaft 25 which extends through base 10 and, at the end which is exposed, carries the manually adjustable knob 15 which is provided for both on/off control of the phonograph motor and reject. The position of knob 15 represented in FIGURES 1 and 2 is the "on" position of the phonograph energizing switch. The "off" position is represented in the dash-dot construction 26 in FIGURE 2 while the reject position is represented by the broken-line construction 27. Obviously, manipulation of knob 15 may adjust the switch operator and reject lever 23 through a like series of positions which may be designated switch-on, switch-off and reject. A spring 28 which is anchored at one end to base 10 and to lever 24 at the opposite end tends to keep reject lever 23 in the position shown. The resistance presented by an on/off switch presently to be described, prevents its returning lever 24 to the "off" position.

At its opposite end, reject lever 23 is secured to a plate 30 which is pivoted on a pin 31. This plate has two arms 32 and 33; the latter may be considered as an extension of reject lever 23. Extension 32 of plate 30 is received by an operating lever 35a of the phonograph on/off switch 35. Whenever reject lever 23 is retracted, retraction being associated with a clockwise rotation of lever 24 as viewed in FIGURE 2, plate 30 likewise rotates in a clockwise direction to displace switch actuator 35a to its "off" position which is shown by dash-dot construction line.

Extension 33 also experiences displacement as the reject mechanism is advanced or retracted. Specifically, plate 30 may be displaced from the position represented in FIGURE 3, this being the "on" position of switch 35, to the farthermost counter-clockwise position shown by broken-line construction in FIGURE 2 so that extension 33 moves along a path across which the trip lever 40 of the record-change apparatus extends to effect displacement of the trip lever in order to institute a record-change cycle. It will be observed that trip lever 40 has a cut-away or trough section which receives the free end of extension 33 such that counter-clockwise rotation of plate 30 causes extension 33 to engage the shoulder portion of trip lever 40 and displace it to the left as viewed in FIGURE 2. Such displacement of extension 33 is occasioned by a mechanical connection between trigger lever 20 and reject lever 23. Specifically, this interconnection is by means of a link 34 which is secured at one end to an extension 22 of trip lever 20. The opposite end of this link has a returned portion 36 defining a hook type of termination. This hook receives a pin 37 which is flattened or headed over to trap hook 36 thus providing a lost motion mechanical connection between lever 20 and reject lever 23. The lost motion of this connection permits manual manipulation of knob 15 to effect operation of the switch operator and reject lever 23 independently of trigger lever 20.

A spring 41 coiled about pivot 21 extends between an anchor plate 42 at one end and trigger lever 20 at the other to bias the trigger to its actuating position, the position shown in broken construction line in FIGURE 2. A latch 43, pivotally mounted at 50 upon a relay 45, has one end connected to a return spring 51 which urges a lip 44 formed at the other end of the latch into engagement with the free end of trigger 20. This arrangement releasably restrains the trigger in the position shown in FIGURE 2 against the bias of spring 41.

It is the function of relay 45, upon energization in response to a received signal, to attract latch 43 as an armature and free trigger 20 from lip 44. However, it is desirable that relay 45 be permitted to respond only to such signals as are received during quiescent conditions of the record-change assembly. The expression "quiescent condition" is intended to means the condition in which the record-change assembly is not executing a record-change cycle. To that end the apparatus includes means for disabling the relay during the operating cycle of the record-change apparatus, this means being shown as a switch having mating and normally closed contacts 46a and 46b. The bifurcated termination of a slide plate 47 included in the record-change apparatus normally engages switch leaf 46a to maintain it in contact with its companion 46b. During the record-change cycle, however, member 47 oscillates from the extreme position shown in FIGURE 2 to another position displaced to the left as viewed in FIGURE 2. During that traverse of member 47, the relay circuit is opened at switch 46 and cannot be closed until member 47 returns to its rest position shown in FIGURE 2.

If trigger 20 has been actuated to initiate a record-change cycle, it is necessary that the trigger be reset preparatory to another reject operation and this is accomplished by reset means actuated in response to the operation of the record-change assembly. More specifically, the reset is in the form of an arm 48 carried on oscillatory member 47 and movable along a path which intercepts the position assumed by a cam section construction 49 on trigger lever 20. The cam section is normal to the body of the trigger and, with the trigger in the broken-line position of FIGURE 2, would be engaged by member 48 to return trigger 20 to its initial position, resetting the trigger and reset lever 23. To facilitate the reset function, the free end of trigger 20 is curved to serve as a cam which may engage cam latch 43 to pivot the latch about its support 50 against the urging of a spring 51. The displacement of trigger 20 occasioned by reset 48 causes a sufficient overtravel that latch 43, being pivoted in a clockwise direction by spring 51, assumes a latching or overlapping engagement with the free end of the trigger.

Certain portions of the record-change assembly have been shown in order to indicate the operating relation of the reject mechanism therewith. Particular reference has been made, for example, to its trip lever 40 and the bifurcation of member 47. Aslo included in this apparatus is the usual one cycle mutilated gear 52 which normally stops with its mutilation 53 interrupting a mechanical driving connection that may otherwise be established with a continuously rotating pinion 54 which is driven by motor 16. When trip lever 40 is moved upwardly and toward the left, as viewed in FIGURE 2, to the position indicated in broken-construction line, a movable tooth is introduced into the mutilation 53 which gives an incremental rotation to gear 52 sufficient to displace the gear and complete a driving connection to pinion 54 which rotates gear 52 in a clockwise direction as represented by the direction arrow. A slot 55 of member 47 receives an eccentric pin 56 carried on the face of gear 52 to complete a crank connection so that member 47 oscillates during the single revolution of gear 52.

Figure 3:
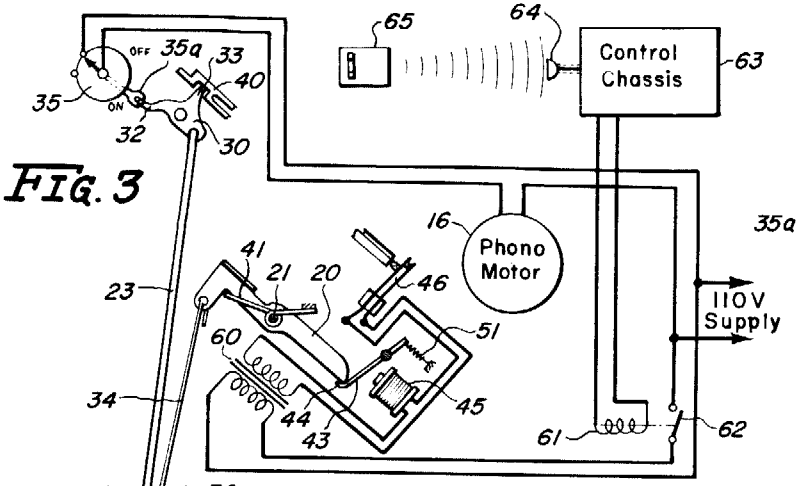
FIGURE 3 is a schematic representation of the electrical aspects of the reject arrangement.

The circuit of FIGURE 3 shows the on/off switch 35 which may control the phonograph motor 16. The operative connection of switch and reject lever 23 through pivoted plate 30 to switch 35 is also represented as is the interconnection of lever 23 and trip lever 40 of the record-change apparatus. Relay 45 is driven from one winding of a transformer 60 and is shown connected in series with switch 46. The other winding of the transformer connects to buses which lead to 110 volts when a reject relay 61 is energized to close a switch 62. Relay 61 is shown connected to a control chassis 63.

The control chassis, for the simple electrical system here under consideration, is a frequency selective amplifier coupled to a transducer or microphone 64. The microphone is provided to pick-up a control signal which may be generated in a portable hand-held transmitter 65. The hand transmitter usually includes longitudinal-mode vibrators such as aluminum rods which, when struck on an end, generate a supersonic signal of a wave length determined by the physical length of the rod. If the transmitter is to control several functions in the instrument which incorporates control chassis [*63*] the resonators will have distinctly different frequencies and each frequency will be assigned to a particular function. For the arrangement represented in the schematic of FIGURE 3, a command signal issued from transmitter 65 at a frequency to which the reject function has been assigned is picked up by microphone 64, amplified in control chassis 63 and delivered to relay 61 to actuate that relay and close switch 62. The closure of this switch energizes relay 45 to initiate a record-change cycle.

In considering the operation of the described arrangement, it will be assumed initially that control knob 15 is adjusted to the position shown in FIGURE 1. This is the "on" position and the reject mechanism and the record-change assembly are as shown in FIGURE 2 with reject lever 23 displaced to operate switch 35 to its "on" position and energize phonograph motor 16. With the phonograph motor energized and records stored on spindle 19, the phonograph may be set into operation by manually positioning knob 15 to the reject position momentarily. It may also be accomplished by operating transmitter 64 to supply to control chassis 63 a command signal of the frequency which energizes reject relay 61. With this relay energized, the primary winding of transformer 60 is likewise energized which results in energization of relay 45. With relay 45 energized, latch 43 is attracted to the relay thus releasing lip 44 from its locking engagement with trigger lever 20. Spring 41 is now free to displace the trigger to its actuated position which draws link 34 vertically upwardly as viewed in FIGURE 2 to rotate plate 24 counter-clockwise on shaft 25. As a consequence, reject lever 23 is likewise displaced vertically upwardly pivoting plate 30 in a counter-clockwise direction to drive extension 33 against trip lever 40. Trip lever 40 is moved along its own axis, toward the left as viewed in FIGURE 2 to, in effect, fill the mutilation of gear 52 and initiate a record-change cycle.

During the record-change cycle, member 47 moves toward the left as viewed in FIGURE 2, opening switch 45 so that relay 45 cannot be reactivated until the cycle which has been started shall have been completed. This is a desirable precaution to assure re-cocking of trigger 20 at the end of that particular record-change cycle.

Early in the cycle, reset 48 engages cam section 49 of the trigger to return it to its initial position where it is re-engaged by latch 43 and restrained against the influence of spring 41. In other words, early in the change cycle the reject mechanism is reset. The change cycle is completed in the usual fashion, feeding another record from the magazine portion of spindle 19 to the turntable for reproduction.

If it be assumed that adjustment knob 15 is in its "off" position, the receipt of a command signal from transmitter 65 to energize reject relay 61 accomplishes two functions. It energizes phonograph motor 16 and then initiates a record-change cycle. The motor is energized because the displacement of lever 23, when trigger 20 is free to operate, actuates on/off switch 35 by means of its extension 32 and then, as part of the same movement of lever 23, displaces trip lever 40 to institute a record-change cycle. Upon completion of this cycle, the reject mechanism is reset to the rest position of FIGURE 2. It is noted that the reset position leaves phonograph switch 35 "on" and does not turn it to its "off" position. The phonograph may be turned "off" by manual manipulation of knob 15 or, for more complete automatic control of the phonograph, another control relay, similar to reject relay 61, may be energized from control chassis 63 in response to a command signal of a specifically different frequency from that which energizes reject relay 61. A second such relay may operate a switch (not shown) to open the circuit of phonograph motor 16.

The arrangement illustrated and described permits remote control of the reject function and also permits turning the phonograph "on" from a remote point. At the same time, there is a desired flexibility in that both the on/off and reject functions may also be controlled manually by the usual control 15 included in the instrument.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A remotely-controlled reject mechanism for an automatic record changer including a record-change assembly having a trip lever which may be actuated to initiate a cycle of operations of said assembly, said reject mechanism comprising: a trigger lever movable from a rest position in which it has no operative association with said record-change assembly to a second position in which it effects actuation of said trip lever; spring means biasing said trigger lever to its aforesaid second position; latch means releasably restraining said trigger lever in its aforesaid rest position against the urging of said spring means; a relay, responsive to a received signal, for actuating said latch means to release said trigger lever and initiate a record-change cycle; and reset means, actuated in response to the operation of said record-change assembly, for restoring said trigger lever to its rest position and for resetting said latch means in restraining relation with respect to said trigger lever.

2. A remotely-controlled reject mechanism for an automatic record changer including a record-change assembly having a trip lever which may be actuated to initiate a cycle of operations of said assembly, said reject mechanism comprising: a reject lever movable from a rest position along a path across which said trip lever extends to effect actuation of said trip lever; a trigger lever mechanically coupled to said reject lever and movable from a rest position to a second position to displace said reject lever along said path; spring means biasing said trigger lever to its aforesaid second position; latch means relatively restraining said trigger lever in its aforesaid rest position against the urging of said spring means; a relay, responsive to a received signal, for actuating said latch means to release said trigger lever and initiate a record-change cycle; and reset means, actuated in response to the operation of said record-change assembly for restoring said trigger lever and said reject lever to their rest positions and for resetting said latch means in restraining relation with respect to said trigger lever.

3. A remotely-controlled reject mechanism for an automatic record changer including a record-change assembly having a trip lever which may be actuated to initiate a cycle of operations of said assembly, said reject mechanism comprising: a trigger lever movable from a rest position in which it has no operative association with said record-change assembly to a second position in which it effects actuation of said trip lever; spring means biasing said trigger lever to its aforesaid second position; latch means releasably restraining said trigger lever in its aforesaid rest position against the urging of said spring means; a relay, responsive to a received signal, for actuating said latch means to release said trigger lever and initiate a record-change cycle; and reset means, included in said record-change assembly, for restoring said trigger lever to its rest position and for resetting said latch means in restraining relation with respect to said trigger lever.

4. A remotely-controlled reject mechanism for an automatic record changer including a record-change assembly having a trip lever which may be actuated to initiate a cycle of operations of said assembly and further having a manually operable reject knob, said reject mechanism comprising: a reject lever connected to said reject knob and movable in response to manipulation of said knob from a rest position along a path across which said trip lever extends to effect actuation of said trip lever; a trigger lever having a lost-motion connection to said reject lever to permit displacement thereof by said reject knob and movable from a rest position to a second position to displace said reject lever along said path; spring means biasing said trigger lever to its aforesaid second position; latch means releasably restraining said trigger lever in its aforesaid rest position against the urging of said spring means; a relay, responsive to a received signal, for actuating said latch means to release said trigger lever and initiate a record-change cycle; and reset means, actuated in response to the operation of said record-change assembly, for restoring said trigger lever and said reject lever to their rest positions and for resetting said latch means in restraining relation with respect to said trigger lever.

5. A remotely-controlled reject mechanism for an automatic record changer including a record-change assembly having a trip lever which may be actuated to initiate a cycle of operations of said assembly and further having a manually operable on/off and reject knob, said reject mechanism comprising: an on/off switch operator and reject lever connected to said reject knob and movable in response to manipulation of said knob from an "off" to an "on" position to operate the on/off switch of said changer and further movable from said "on" position along a path across which said trip lever extends to effect actuation of said trip lever; a trigger lever having a lost-motion connection to said reject lever to permit displacement thereof by said reject knob and movable from a rest position to a second position to displace said reject lever along said path; spring means biasing said trigger lever to its aforesaid second position; latch means releasably restraining said trigger lever in its aforesaid rest position against the urging of said spring means; a relay, responsive to a received signal, for actuating said latch means to release said trigger lever and initiate a record-change cycle; and reset means, actuated in response to the operation of said record-change assembly, for restoring said trigger lever and said reject lever to their rest positions and for resetting said latch means in restraining relation with respect to said trigger lever.

6. A remotely-controlled reject mechanism for an automatic record changer including a record-change assembly having a trip lever which may be actuated to initiate a cycle of operations of said assembly, said reject mechanism comprising: a trigger lever movable from a rest position in which it has no operative association with said record-change assembly to a second position in which it effects actuation of said trip lever; spring means biasing said trigger lever to its aforesaid second position; latch means releasably restraining said trigger lever in its aforesaid rest position against the urging of said spring means; a relay, responsive only to a signal received during quiescent conditions of said record-change assembly, for actuating said latch means to release said trigger lever and initiate a record-change cycle; and reset means, actuated in response to the operation of said record-change assembly, for restoring said trigger lever to its rest position and for resetting said latch means in restraining relation with respect to said trigger lever.

7. A remotely-controlled reject mechanism for an automatic record changer including a record-change assembly having a trip lever which may be actuated to initiate a cycle of operations of said assembly, said reject mechanism comprising: a trigger lever movable from a rest position in which it has no operative association with said record-change assembly to a second position in which it effects actuation of said trip lever; spring means biasing said trigger lever to its aforesaid second position; latch means releasably restraining said trigger lever in its aforesaid rest position against the urging of said spring means; a relay, responsive to a received signal, for actuating said latch means to release said trigger lever and initiate a record-change cycle; means for disabling said relay during the operating cycle of said record-change apparatus; and reset means, actuated in response to the operation of said record-change assembly, for restoring said trigger lever to its rest position and for resetting said latch means in restraining relation with respect to said trigger lever.

8. A remotely-controlled reject mechanism for an automatic record changer including a record-change assembly having a trip lever which may be actuated to initiate a cycle of operations of said assembly, said reject mechanism comprising: a trigger lever movable from a rest position in which it has no operative association with said record-change assembly to a second position in which it effects actuation of said trip lever; spring means biasing said trigger lever to its aforesaid second position; latch means releasably restraining said trigger lever in its aforesaid rest position against the urging of said spring means; a relay, responsive to a received signal, for actuating said latch means to release said trigger lever and initiate a record-change cycle; a switch connected in series with said relay and closed only during quiescent conditions of said record-change apparatus; and reset means, actuated in response to the operation of said record-change assembly, for restoring said trigger lever to its rest position and for resetting said latch means in restraining relation with respect to said trigger lever.

9. *In an automatic record changer having a record changer mechanism operable in a cyclic manner including control means for initiating a cycle of said changer mech-*

*anism, manually operable selector means operable to off, on, and reject positions, and actuator means coupled to said selector means operative as said selector means is moved to the reject position to effect operation of said control means in the initiation of a cycle of said record changer mechanism, the improvement which comprises: auxiliary control means including a movable member operable from a first position to a second position to effect displacement of said manually operable selector means and said actuator means from the off and on positions to the reject position to thus effect operation of said control means and initiation of a cycle of said record changer mechanism, and remotely controlled means including means operative to selectively actuate said movable member to initiate a cycle of the record changer mechanism.*

References Cited by the Examiner

The following references, cited by the Examiner, are of record in the patented file of this patent or the original patent.

UNITED STATES PATENTS

| | | | |
|---|---|---|---|
| 2,085,582 | 6/1937 | Guedon | 274—1.11 |
| 2,287,727 | 6/1942 | Cranmer | 274—1.11 |
| 2,411,612 | 11/1946 | Boyajian | 274—10.1 |
| 2,436,529 | 2/1948 | Pressley | 274—1.11 |
| 2,558,060 | 6/1951 | Rudolph | 274—10 |
| 2,868,545 | 1/1959 | Vistain | 274—10 |

EVON C. BLUNK, *Primary Examiner.*

EMIL G. ANDERSON, NORTON ANSHER, *Examiners.*